Jan. 24, 1939. R. WENIGER 2,144,696
LIQUID LEVEL
Filed June 25, 1937
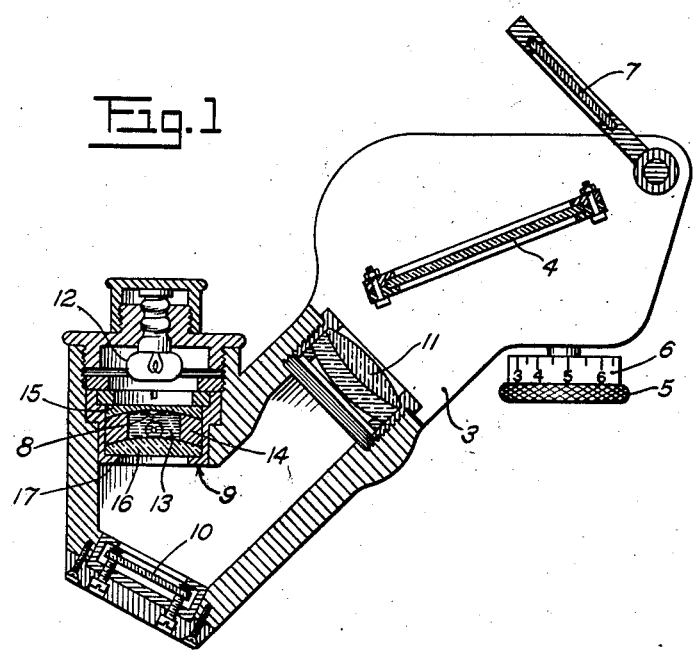
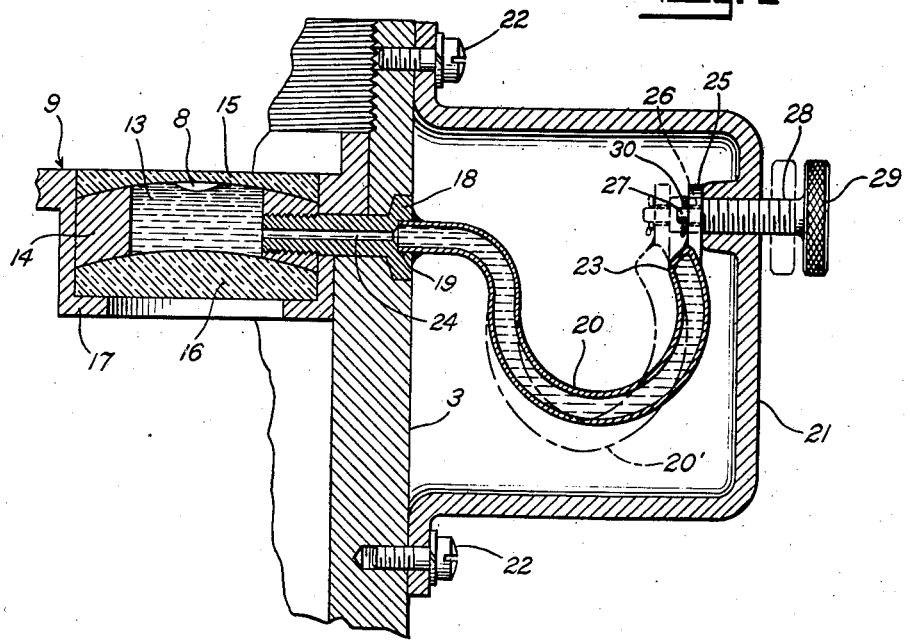
INVENTOR.
Richard Weniger
BY
Stephen Cerstvik
ATTORNEY.

Patented Jan. 24, 1939

2,144,696

UNITED STATES PATENT OFFICE 2,144,696

LIQUID LEVEL

Richard Weniger, Brooklyn, N. Y., assignor to Bendix Aviation Corporation, South Bend, Ind., a corporation of Delaware Application June 25, 1937, Serial No. 150,408

6 Claims. (Cl. 33—213)

The present invention relates to liquid levels adapted for use in sextants, octants, range finders and other instruments wherein it is desired to provide an artificial horizon by means of a bubble, and more particularly to means for forming the bubble and for adjusting its size.

It is known that in precision instruments of the above-referred-to types in which a sealed bubble vessel is used, the size of the bubble varies due to expansion and contraction of the liquid in the vessel when the latter is subjected to changes in temperature.

Also, different observers using instruments of the class described desire bubbles of different sizes.

Bubble vessels with means for adjusting the size of the bubble have been provided heretofore. For example, there has been provided an adjustable liquid level comprising a reservoir chamber connected to the bubble chamber, a circular flexible diaphragm in the reservoir, and an adjusting screw abutting or secured to the center of the diaphragm for distorting said diaphragm, thereby changing the volume of the reservoir and, hence, the amount of liquid in the bubble chamber, thus varying the size of the bubble. It was found, however, that continually distorting the diaphragm caused it to deteriorate and crack near its periphery which was rigidly held in place and formed a seal, thereby breaking the seal and causing the liquid to leak out of the reservoir and bubble chamber.

Accordingly, one of the objects of the invention is to provide a bubble vessel with novel means for adjusting the size of the bubble, whereby the foregoing difficulties are eliminated and leaks prevented.

Another object of the invention is to provide a bubble chamber with novel bubble adjusting means comprising a flexible reservoir which is rugged, easily manipulated and not subject to deterioration after prolonged use.

A further object is to provide a novel adjustable liquid level comprising, in combination, a bubble chamber, and an adjustable Bourdon tube forming a flexible reservoir having communication with the bubble chamber, whereby upon adjustment of the Bourdon tube the size of the bubble in the bubble chamber is varied.

Still another object is to provide a novel adjustable liquid level comprising, in combination, a bubble chamber, a resilient tube forming a flexible reservoir having one end connected to the bubble chamber and its other end sealed, and means for moving the sealed end to adjust the size of the bubble formed in the bubble chamber.

A still further object is to provide a novel adjustable liquid level comprising, in combination, a bubble chamber, a rigid but resilient curved tube of metal forming a flexible reservoir, means forming a restricted passage connecting the bubble chamber to one end of said resilient tube, the other end of said tube being sealed, and means for flexing said tube to adjust the size of the bubble formed in the bubble chamber.

The above and other objects and advantages of the invention will appear more fully hereinafter from a consideration of the detailed description which follows, taken together with the accompanying drawing wherein one embodiment of the invention is illustrated as applied to a sextant by way of example. It is to be expressly understood, however, that the drawing is for purposes of illustration only and is not to be construed as defining the limits of the invention, reference being had for this purpose to the appended claims.

In the drawing wherein like reference characters refer to like parts in the two views, Fig. 1 is a vertical longitudinal section through a sextant provided with one form of novel liquid level embodying the invention; and Fig. 2 is an enlarged section through the novel liquid level, showing the adjusting or regulating means of the invention.

The invention consists substantially in the form, construction, combination, location and relative arrangement of parts for obtaining the results desired in accordance with the foregoing objects, as will be more fully hereinafter set forth in the specification, as shown in the drawing by way of example, and as finally pointed out in the claims.

Referring now to the drawing and more particularly to Fig. 1, one embodiment of the invention is shown applied to a sextant comprising a frame 3 having mounted thereon an adjustable index mirror 4 provided with a knurled adjusting knob 5 drivably connected to the mirror 4 by suitable driving meeans such as gears (not shown). On the knurled knob 5 there is a calibrated scale 6 for indicating the amount of angular adjustment of the index mirror. An adjustable sun glass 7 may be used when it is desired to take a sight upon the sun, but may be easily turned so as to be out of the field of view when a sight is to be taken upon another celestial body. The body is viewed directly through the index mirror 4 and for this purpose said mirror is made semitransparent. The celestial body sighted is correlated with an image of a bubble 8 formed by the liquid level 9, the image being reflected by a mirror 10, and focused onto the index mirror 4 by a collimating lens 11.

In order that the instrument may be used for taking observations at night there is provided an electric lamp 12 which is located above the liquid level 9, thereby illuminating the bubble 8.

The liquid level 8 and the novel adjusting means embodying the present invention are shown in more detail in Fig. 2. The level comprises a bubble chamber 13 formed by a cylindrical vessel 14, a top lens 15 and a bottom lens 16, the whole assemblage being held together in a cylindrical housing 17 carried by the frame 3.

The novel means of the invention are now provided for forming the bubble 8 in the bubble chamber 13 and for adjusting the size of said bubble. To this end the bubble chamber 13 is connected by means of a coupling member 18 to one end 19 of a flexible reservoir comprising a metal Bourdon tube 20 located in a housing 21 attached to the side of the frame 3 in any suitable manner as by means of screws 22. The other end 23 of the Bourdon tube 20 is sealed and arranged to be moved to the left and right, as seen in Fig. 2, in order to cause a flexing of the tube into a shape such as is indicated in dotted lines at 20'.

The coupling member 18 provides a restricted passage 24 through which liquid is forced into and out of the bubble chamber 13 from the Bourdon tube 20 upon flexing of the latter by movement of its end 23.

In order to produce the desired adjusting movement of the end 23 of the tube 20, the latter is provided at said end 23 with a piece 25 having an opening 26 through which passes a pin 27 carried by a screw member 28 threaded in a passage through a wall of the housing 21 so as to be accessible from the exterior thereof for manual adjustment by a knurled knob 29 secured to or formed integrally with the screw member 28. Disengagement of the pin 27 from the end piece 25 is prevented by a cotter pin 30 although the pin 27 is permitted free rotational movement in the opening 26 of said piece 25.

It will be seen that as the screw member 28 is turned by knob 29 it will move longitudinally to the right or left as viewed in the drawing thereby moving the end 23 of the tube 20 to flex or unflex it, thereby forcing the liquid contained therein into or out of the bubble chamber 13 through the passage 24, thus varying the size of the bubble 8 to any desired extent.

By this construction there is no sharp flexing or bending of metal parts to cause cracking of the metal and thereby producing leaks as in the case of a reservoir formed by a diaphragm.

There is thus provided a liquid level provided with novel means for adjusting the size of the bubble without danger of producing leaks, the adjusting means including a flexible reservoir formed by a Bourdon tube having one end thereof connected to the bubble chamber and having the other end sealed, and means for adjustably moving the sealed end to force liquid into and out of the bubble chamber from said reservoir.

Although only one embodiment of the invention has been illustrated and described, as applied to a sextant by way of example, various changes in the form, construction and relative arrangement of parts, which will now appear to those skilled in the art, may be made without departing from the spirit or scope of the invention. Reference is, therefore, to be had to the appended claims for a definition of the limits of the invention.

What is claimed is:

1. An adjustable liquid level comprising a bubble chamber, a reservoir chamber formed by a curved flexible tube having one end thereof connected to said bubble chamber and having its other end sealed, and adjustable means connected to said sealed end for moving the latter.

2. An adjustable liquid level comprising a bubble chamber, a flexible reservoir chamber formed by a Bourdon tube having communication with said bubble chamber, a liquid in said two chambers and forming a bubble in said bubble chamber, and means for flexing said tube to force the liquid contained therein into and out of the bubble chamber, whereby the size of the bubble may be adjustably varied.

3. An adjustable liquid level comprising a bubble chamber, a reservoir chamber formed by a curved flexible tube having one end thereof connected to said bubble chamber and having its other end sealed, adjustable means connected to said sealed end for moving the latter, and means providing a restricted passage between the bubble chamber and the flexible tube.

4. An adjustable liquid level comprising a bubble chamber, a flexible reservoir chamber formed by a Bourdon tube having communication with said bubble chamber, a liquid in said two chambers and forming a bubble in said bubble chamber, means for flexing said tube to force the liquid contained therein into and out of the bubble chamber, whereby the size of the bubble may be adjustably varied, and means providing a restricted passage between the bubble chamber and the Bourdon tube.

5. An adjustable liquid level comprising a bubble chamber, a reservoir chamber formed by a curved flexible metal tube having one end thereof connected to said bubble chamber and having its other end sealed, and adjustable means connected to said sealed end for moving the latter.

6. An adjustable liquid level, comprising a bubble chamber, a reservoir chamber, a liquid in said bubble chamber forming a bubble therein, means connecting said reservoir and bubble chambers for liquid flow between said reservoir and bubble chambers, said reservoir chamber comprising a member providing an enclosure of gradual degree of curvature, and means for adjusting said curvature whereby said bubble can be minutely adjusted and strains in said reservoir member are prevented.

RICHARD WENIGER.